Dec. 22, 1959  K. GEBELE ET AL  2,917,983
SETTING MECHANISM FOR PHOTOGRAPHIC CAMERA EXPOSURES
Filed Jan. 30, 1956  4 Sheets-Sheet 1

Dec. 22, 1959 K. GEBELE ET AL 2,917,983
SETTING MECHANISM FOR PHOTOGRAPHIC CAMERA EXPOSURES
Filed Jan. 30, 1956 4 Sheets-Sheet 2

Dec. 22, 1959 K. GEBELE ET AL 2,917,983
SETTING MECHANISM FOR PHOTOGRAPHIC CAMERA EXPOSURES
Filed Jan. 30, 1956 4 Sheets-Sheet 3

Fig. 7

United States Patent Office 2,917,983
Patented Dec. 22, 1959

2,917,983
SETTING MECHANISM FOR PHOTOGRAPHIC CAMERA EXPOSURES

Kurt Gebele and Ewald Spiessl, Munich, Germany, assignors to Hans Deckel, Munich, Germany, and Friedrich Wilhelm Deckel, Zug, Switzerland Application January 30, 1956, Serial No. 562,333

Claims priority, application Germany February 1, 1955

20 Claims. (Cl. 95—64)

The present invention relates to photographic cameras, and more particularly to the setting means or mechanism for setting the various adjustable members in accordance with the variable factors which enter into the making of a photographic exposure, such as illumination conditions, distance from camera to principal object, desired depth of field, and other variable conditions.

An object of the invention is the provision of generally improved and more satisfactory means for setting the camera in accordance with the variable factors which enter into the taking of a picture.

Another object is the provision of simple and satisfactory means for setting the diaphragm aperture or stop, in accordance with flashlight or flashbulb conditions, in a manner to eliminate the need for mental calculations or arithmetic on the part of the photographer.

Still another object is the provision of simple and sturdy means enabling quick and easy adjustment of the camera for taking, selectively, either flashlight pictures or natural light pictures.

A further object is the provision of an improved form of photographic shutter unit having an adjustable diaphragm and a focusing lens mount, and having simple and easily operable means for coupling the diaphragm adjustment to the focusing adjustment when taking flashlight pictures, and coupling the diaphragm adjustment to the shutter speed adjustment when taking natural light pictures.

A still further object is the provision of a photographic shutter unit or assembly including both a light value scale or integrated exposure value scale for use when taking photographs by natural light, and a flashlight guide number scale for use in setting the adjustable parts of the unit when taking flashlight pictures.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
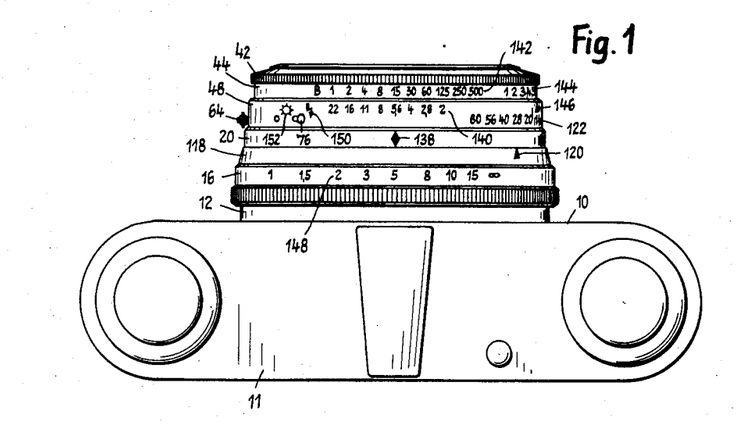
Fig. 1 is a top plan view of a camera equipped with a shutter unit in accordance with a first form of the present invention.
Figures 2, 3:
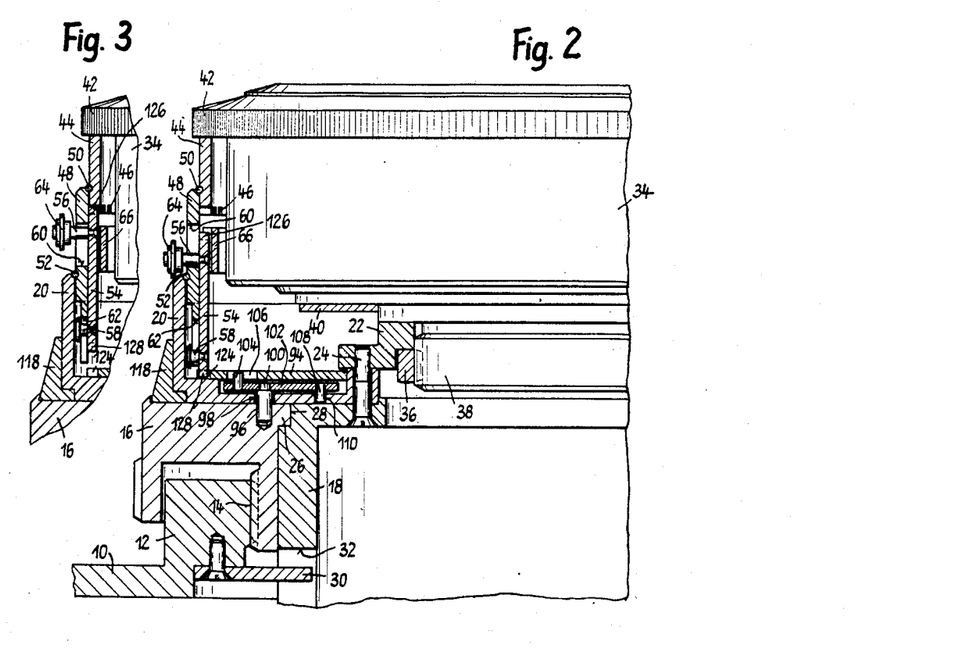
Fig. 2 is a fragmentary radial section taken axially through a portion of the shutter unit and the associated camera, showing the parts set for a flashlight picture.
Fig. 3 is a view similar to a portion of Fig. 2 showing the parts set for a picture by natural light.

Referring first to the form of the invention illustrated in Figs. 1-7, there is a photographic camera body indicated in general at 11, the details of construction of the camera itself being of any conventional form. The camera has a front wall or front plate 10 on which is mounted the circular or annular flange 12 projecting forwardly, concentrically with the optical axis. This flange is internally screw threaded at 14 to mate with corresponding external screw threads on a focusing ring member 16 which is somewhat U-shaped in radial cross section as seen in Fig. 2, so that the threaded part of the member 16 engages inside the flange 12, while an external axially extending flange of the member 16 surrounds the outside of the flange 12 and is provided with a circumferentially extending rib which is knurled or roughened for easy grasping by the operator, to turn the entire ring 16 relative to the stationary ring 12 so that the ring 16 will ride axially forwardly or backwardly as it is turned, for the purpose of focusing the camera.

Secured to the focusing ring 16, to move axially with it but not to rotate therewith, is a tubular member 18 having at its forward end an inwardly extending lip or flange secured by screws 24 to a shutter mounting ring 22 and also to a body member 20 which is of generally L-shaped cross section, having a peripheral flange which is cylindrical and an inwardly extending flange or annular plate portion which lies against the forward face of the member 18 as well seen in Fig. 2, and which also makes contacts with the ring 22. A lip 26 at the forward inner corner of the focusing ring 16 rotates in a circumferential groove or rabbet 28 formed in the tube 18 and abuts against the rear face of the body member 20, so as to be able to rotate relative to the members 18, 20, and 22, while these three members (all fastened firmly together by the screws 24) are held against rotation by a fixed lug or finger 30 secured to the camera 10 and extending into an axial groove or slot 32 in the tube 18. Thus, as the focusing ring 16 is turned, the screw threaded engagement of this ring with the fixed flange or ring 12 will cause the ring 16 to move axially forwardly or backwardly, and this will carry the parts 18, 20, and 22 axially forwardly and backwardly with it, but these last mentioned parts will not rotate relative to the camera parts 10 and 12.

The ring 22 carries the casing of an objective shutter indicated in general at 34, conveniently mounted on the ring 22 by means of a retaining nut 36 screwed on external screw threads of the rear lens tube 38 commonly found on objective shutters and fitting within the ring 22, concentrically with the optical axis. The shutter casing 34 and lens tube 38 contain the lenses as well as the usual parts commonly found in an objective shutter, including movable shutter blades for opening and closing the light passage along the optical axis, and movable iris diaphragm leaves or blades for adjusting the size of the diaphragm aperture or stop, in known manner. The interior details of the shutter construction are not important for purposes of the present invention, and may be widely varied. Typical examples of suitable forms of shutter which may be used for this purpose are disclosed for example, in the copending United States patent applications of Kurt Gebele, Serial No. 514,218, filed June 9, 1955, (issued August 25, 1959, as Patent 2,900,885) and Serial No. 520,875, filed July 8, 1955 (issued on Augustt 25, 1959, as Patent 2,900,886). The shutter is cocked or tensioned, and released or triggered, when making an exposure, in suitable known manner, such as through a shaft extending parallel to but offset laterally from the optical axis, extending out the back of the shutter and connected with suitable control parts in the camera body, the shaft having telescopic parts so as not to interfere with the forward and backward focusing movements of the shutter unit.

As usual in an object shutter, the size of the diaphragm aperture or stop is controlled by the position of a diaphragm adjusting ring 40 mounted for rotation near the rear of the shutter casing, and the speed or duration of the exposure made by movement of the shutter blades is adjusted by turning a speed adjusting ring 42 rotatably mounted approximately at the front of the shutter casing. In this instance, the speed adjusting ring 42 is provided with a cylindrical flange or skirt 44 which projects rearwardly from the speed adjusting ring 42, in surrounding relation to the stationary shutter casing 34, the flange 44 being fixed to and turning with the adjusting ring 42. The rear edge of the flange 44 is provided, through part of its circumference, with notches or teeth 46.

Figure 4:
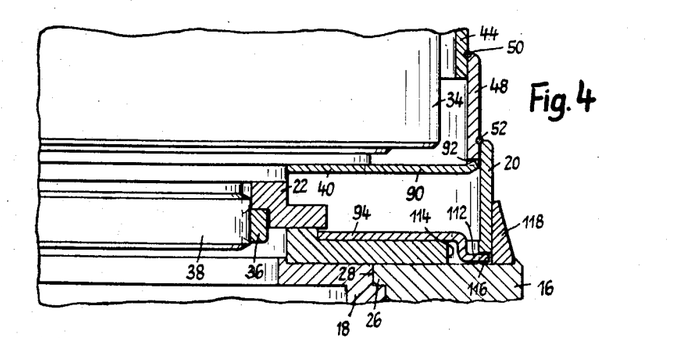
Fig. 4 is an axial radial section on a radial plane different from that of Fig. 2, illustrating additional details.

Arranged intermediate between the flange 44 of the speed adjusting ring and the fixed body flange 20, is a ring 48 which may be termed a coupling ring or intermediate ring, and which is rotatable with respect to both of the members 20 and 44, except when coupled to the latter. This ring 48, as best seen in Figs. 2 and 4, externally overlaps the rear edge of the ring 44 and internally overlaps the front edge of the ring or flange 20. The ring 48 is held against axial movement by means of a split snap ring 50 seated in a circumferential groove in the ring 44 at the front edge of the ring 48, and a split snap ring 52 seated in a circumferential groove on the ring 48 at the front edge of the flange 20. The ring 48 carries a double ended dog or pawl 54 on the inner face of the ring 48, axially slidable on the ring 48 but non-rotatable with respect to the ring, so that as the ring 48 turns, the dog or pawl 54 moves bodily with it in a circumferential direction. The mounting of the dog 54 is by means of pins 56 and 58 riveted to the dog 54 and extending radially outwardly through axial slots 60 and 62, respectively, in the ring 48. The outer end of the pin 56 is provided with an enlarged head 64 which constitutes a finger piece or actuating knob for manual operation of the dog 54.

The previously mentioned diaphragm aperture setting ring 40 has at one side (preferably diametrically opposite to the dog 54) an outwardly extending radial arm 90 (see Fig. 4) the outer end of which is engaged in a notch 92 at the rear edge of the coupling ring 48. In this way the rotary movements of the diaphragm adjusting ring 40 are imparted to the ring 48, or vice versa, so that these two members always turn together as a unit. The ring 48, in turn, is coupled to the speed adjusting ring 42, 44 to turn therewith whenever the teeth 126 at the forward end of the dog 54 are moved forwardly into engagement with the teeth 46 at the rear edge of the ring 44, but the ring 48 is uncoupled from the ring 44 so that each of these two members may turn independently of the other, whenever the dog 54 is moved axially rearwardly to disengage the teeth 126 from the teeth 46. The dog 54 is moved forwardly and rearwardly, under certain conditions, by a slide member 66 and associated parts, the details of which will be described later.

There is also a rotatable ring 94 which may be called a follower ring, lying in front of the annular or radial flange or plate of the member 20 (see Figs. 2, 4, 5, and 7) and rotatable about the optical axis of the unit as a center. As explained below, this follower ring 94 plays a part in transmitting the rotary movements of the focusing ring 16 to the diaphragm adjusting ring 40, when flashlight pictures are to be taken. The purpose of employing the follower ring 94 instead of coupling the parts directly to the focusing ring 16 is because there is a non-linear relation between the turning movement of the focusing ring 16 for a given change in focus and the turning movement which should be imparted to the diaphragm adjusting ring 40 to compensate for a corresponding change in the distance from the camera to the object being photographed (to be illuminated by the flashlamp). This non-linear relationship can be taken into account by using the intermediate follower ring 94, and by driving this follower ring 94 from the focusing ring 16 through transmission mechanism which will move the ring 94 in a general way according to the movements of the ring 16, but in a slightly irregular or non-linear relation thereto. Thus the ring 94, like the ring 48, may be called an intermediate ring.

Figure 7:
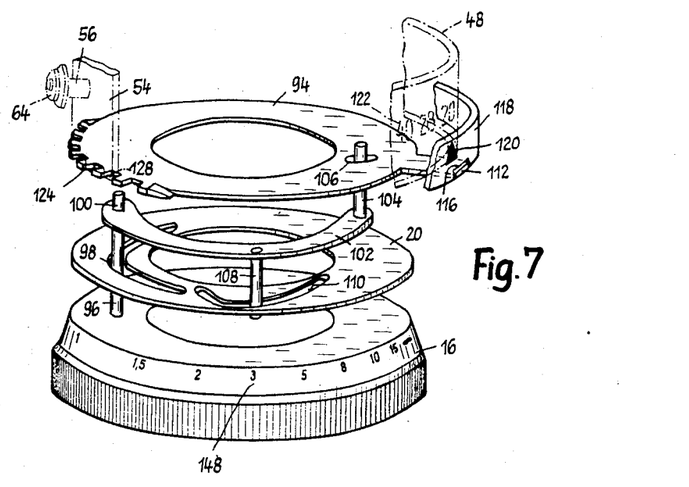
Fig. 7 is a diagrammatic perspective view of part of the mechanism for varying the diaphragm adjustment in accordance with a variation in the focus adjustment, when making flashlight pictures.

The non-linear transmission mechanism is constructed as best seen in Fig. 7, to which reference is now made along with Fig. 2. A pin 96 is fixed in the focus adjusting ring 16 and projects forwardly through an arcuate slot 98 in the member 20, which slot is concentric with the optical axis so as not to interfere with rotary movement of the ring 16 and pin 96. The forward end 100 of the pin 96 forms a pivot for one end of a curved lever 102, the opposite end of which carries a pin 104 projecting forwardly into a radial slot 106 in the follower ring 94. In this way, the rotary movement of the focus adjusting ring 16 is transmitted, through the lever 102 and pin 104, to the follower ring 94. So long as the pin 104 remains at a fixed radial distance from the center of rotation, the rotary movements of the ring 94 will follow exactly the rotary movements of the ring 16. But if the pin 104 is shifted inwardly or outwardly, toward or away from the center of rotation (that is, the optical axis of the unit) this will cause a slight variation in the angular position of the follower ring 94 relative to the angular position at any given instant of the ring 16, thereby enabling a non-linear relationship between the turning of the ring 16 and the turning of the ring 94, to any extent required within the reasonable limits of the device. To accomplish this radial movement of the pin 104, to secure the non-linear result desired, the lever 102 is provided intermediate its length with a drive pin 108 which extends rearwardly from the lever, into a cam slot 110 formed in the fixed member 20. As the focusing ring 16 turns, the drive pin 108 will be moved in one direction or the other along the cam slot 110, and the cam slot is, of course, shaped in the required manner to move the lever 102 to carry the pin 104 radially inwardly or outwardly as required at different points of its travel, to produce the desired non-linear relationship between the turning of the focusing ring 16 and the turning of the follower ring 94.

Figure 5:
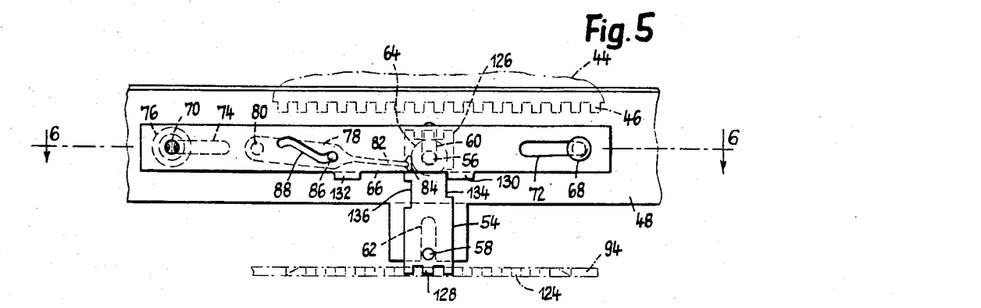
Fig. 5 is a fragmentary developed elevation of part of the adjusting mechanism shown in Figs. 2 and 3, viewed internally from the inside toward the periphery.
Figure 6:
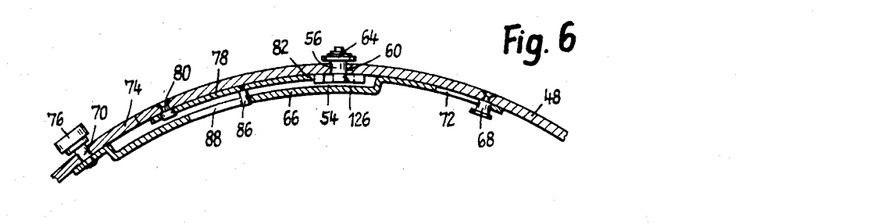
Fig. 6 is a section taken substantially on the line 6—6 of Fig. 5, substantially on a plane perpendicular to the optical axis of the shutter unit.

The follower ring 94 is provided, on part of its periphery, with teeth or notches 124 adapted to interengage with teeth 128 on the rear end of the dog 54. It has already been mentioned that teeth 126 on the forward end of this dog 54 are adapted to engage the teeth or notches 46 on the speed setting ring member 44. It will be seen from Fig. 5 that the dog 54 is not long enough to engage both sets of teeth 46 and 124 at the same time. When the dog 54 is moved axially rearwardly to its rearmost position as shown in Figs. 2 and 5, its teeth 128 will be engaged with the teeth 124 and thus the coupling ring 48 and the diaphragm aperture adjusting ring 40 will be coupled to the focus adjusting ring 16 for rotary movement therewith, through the intermediate non-linear transmission mechanism above described. When the dog 54 is moved axially forwardly from the position shown in Figs. 2 and 5 to the position shown in Fig. 3, the coupling ring 48 will be uncoupled from the focus adjusting ring 16, and will then be coupled to the shutter speed adjusting member 44, thus producing a driving or coupling relationship between the shutter speed adjusting members 42 and 44 and the diaphragm aperture adjusting member 40, since the latter is at all times permanently coupled to the ring 48 to turn therewith.

For actuating the coupling dog 54 in an axial direction, there is provided an actuating slide 66 (Figs. 5 and 6) which, at its ends, lies against the inner face of the coupling ring 48 and which is bent intermediate its ends to space the intermediate portion inwardly away from the ring 48 so as to clear the dog 54, as shown. This slide member 66 is mounted for limited circumferential movement on the ring 48 by means of a pin 68 on the ring 48 engaging a slot 72 extending circumferentially in one end of the member 66, and a pin 70 fixed to the other end of the slide 66 and extending radially outwardly through a circumferential slot 74 in the ring 48, terminating in an enlarged outer end 76 which constitutes a finger piece for manual actuation by the operator.

Between the ring 48 and the intermediate part of the slide 66, there is a resilient spring member 78, the left hand end of which (when viewed as in Figs. 5 and 6) is pivoted at 80 to the ring 48, and the right end of which is thinned as at 82 to be reasonably flexible and resilient, and enters a notch or recess 84 in the left edge of the dog 54. Intermediate its length, the member 78 carries a pin 86 which projects radially inwardly toward the optical axis and engages a cam slot 88 in the slide member 66.

This cam slot 88 is shaped so that when the slide member 66 is moved to the leftward limit of its circumferential movement (this being the position shown in Figs. 5 and 6) the cam slot 88 will carry the pin 86 rearwardly with respect to the optical axis downwardly when viewed as in Fig. 5) so that the spring member 78, 82 will tend to move the dog 54 axially rearwardly to engage the rear teeth 128 thereof with the teeth or notches 124 in the follower ring 94. However, even in this position of the slide 66, the resilience of the spring portion 82 of the member 78 is such that forward finger pressure can be applied to the finger piece 64 to flex the spring 82 and move the dog 54 forwardly to disengage it temporarily from the member 94, but when the forward finger pressure on the finger piece 64 is released, the spring 82 will again move the dog 54 rearwardly to couple the ring 48 to the ring 94. If the slide member 66 is moved circumferentially to the opposite limit of its motion, the shape of the cam slot 88 will move the pin 86 forwardly, so that the spring 78, 82 will tend to move the dog 54 axially forwardly, to disengage it from the ring 94 and engage it with the teeth 46 of the shutter speed setting member 44. But again in this position, the flexibility of the spring portion 82 is such that, by applying finger pressure direct to the finger piece 64, the dog 54 can be moved axially rearwardly to disengage it temporarily from the teeth 46, and upon the release of such finger pressure the spring 82 will again move the dog 54 forwardly to couple the ring 48 to the speed adjusting member 44.

Laterally bent ears 130 and 132 on the slide member 66 constitute stops cooperating with notches 134 and 136 in the edges of the dog 54, to limit axial movement of the dog 54 to a desired extent. In the position shown in Fig. 5, in which the spring 78, 82 normally couples the dog 54 to the follower ring 94, the engagement of the lug 130 in the notch 134 allows the dog 54 to be moved axially forwardly (by the finger piece 64) far enough to disengage the dog from the follower ring 94, but not far enough to engage it with the teeth 46 of the flange 44. Similarly, when the slide 66 is moved to the opposite end of its travel, the lug 132 will lie in the notch 136 and will allow the dog 54 to be moved rearwardly against the spring pressure, far enough to disengage it from the teeth 46 but not far enough to engage it with the teeth of the ring 94.

As best seen in Fig. 4, the follower ring 94 has a radial arm 112 which extends outwardly, then rearwardly, then outwardly again and passes through an arcuate slot in the fixed member 20, to engage in a notch in an index ring 118 which is rotatable on the fixed member 20 just in front of the focus adjusting ring 16. Thus the ring 118 is coupled to and turned with the follower ring 94. This ring 118 carries an index mark 120 (Fig. 1) which cooperates with and is read in conjunction with a scale 122 arranged circumferentially or peripherally on the coupling ring 48, which scale is graduated in terms of the guide numbers commonly used in connection with photoflash lamps employed in flash photography.

In addition to the photoflash guide number scale, various other scales are provided as seen in Fig. 1. The stationary member 20 carries a main reference mark or pointer 138, which is the index mark for reading a diaphragm aperture scale 140 carried by the coupling ring 48 and a shutter speed scale 142 carried by the flange 44, as well as the focus distance scale 148 carried by the focusing ring 16. The flange 44 also carries an integrated exposure value scale 144 read in conjunction with a reference mark 146 on the ring 48. Near the actuating knob 76, the coupling ring 48 also carries a flash symbol 150 to show when the knob 76 is in proper position for a flashlight photograph, and a sunlight symbol 152 to indicate the proper position of the knob for a photograph by natural light.

As is well understood by those familiar with flash photography, the above mentioned flash guide numbers vary according to the type or kind of flashbulb employed, the character of the reflector used, and also according to the speed rating or sensitivity rating of the particular film to be employed. The guide number depends also to some extent on the shutter speed, if the shutter speed is a limiting factor in any particular exposure, but whenever the shutter speed is set slow enough so that the duration of the exposure is determined really by the duration of the flash rather than by the time that the shutter blades are open, then the guide number is independent of shutter speed, and this is the way that most flash photographs are made, with the effective duration of the exposure determined by the duration of the flash rather than by the mechanical operation of the shutter. For any given guide number, there is a product relationship or reciprocal relationship between the diaphragm aperture (expressed as an $f$ number) and the distance from the camera to the subject being illuminated by the flashlamp.

Bearing in mind the foregoing basic facts of flashlight photography, it is seen that the present invention provides a very convenient and rapid means for taking a series of flashlight photographs under varying conditions, so long as there is no change in the factors that determine the guide number. At the beginning of a series of flashlight photographs, the photographer loads his camera with a given type of film, and ordinarily he will use the same type of flashbulb in the same reflector, throughout the entire series of photographs. Since these are the factors that determine the guide number, they remain constant in normal usage, throughout the series of exposures. To prepare for taking flashlight photographs, the operator moves the knob 76 to the right when viewed above as in Fig. 1, to bring the knob close to the flash symbol 150, so that the cam slot 88 will move the pin 86 in a direction rearwardly with respect to the optical axis, likewise causing rearward movement of the dog 54. If the index 120 is not already opposite the proper photoflash guide number on the scale 122, the operator then applies forward pressure to the finger piece 64, to move the dog 54 temporarily forwardly against the force of the spring 82, so as to uncouple the dog 54 from the follower ring 94. While maintaining this forward pressure and maintaining the temporarily uncoupled condition, he turns either the ring 48 or the focusing ring 16 or both, as may be necessary in order to bring the index mark 120 opposite the proper guide number on the scale 122, as determined by the film with which the camera is loaded, and the reflector and flashbulb which are to be employed. When the index mark 120 is brought opposite the proper guide number, forward pressure on the finger piece 64 is released and the spring 82 will move the dog 54 rearwardly to engage the teeth 128 thereof with the teeth 124 of the follower ring 94. The shutter speed ring 42 is set for a slow enough speed so that the duration of the exposure will be determined by the flashlamp rather than by the mechanical operation of the shutter, and this is ordinarly done by setting the shutter for a speed of about 1/15 of a second or 1/30 of a second.

The picture may now be taken in the usual manner, after focusing the camera for the required distance from the camera to the main object being photographed, without any further attention to adjusting the size of the diaphragm aperture or stop. Thus there is entirely eliminated the extra step, so troublesome especially to amateur or inexperienced photographers, of adjusting the diaphragm in accordance with the distance from the camera to the principal object, in order to obtain good flashlight photographs. When the focusing ring 16 is turned to focus the camera upon an object at a greater distance, the turning motion of the focusing ring 16 is transmitted, through the non-linear transmission described in connection with Fig. 7, to the follower ring 94, and since this ring 94 is coupled at this time by the dog 54 to the ring 48, which remains permanently coupled to the diaphragm adjusting ring 40, it follows that the diaphragm will be adjusted to the appropriate extent to open it up to a larger diaphragm aperture or stop (that is, a smaller $f$ number) when the camera is focused upon a more distant object. Conversely, when the focusing ring 16 is turned to focus upon a nearer object, the diaphragm adjusting ring 40 is likewise turned to stop down the diaphragm (to a larger $f$ number) which is now required because of the lesser distance from the camera to the object. Once having determined the proper guide number and having set the shutter unit for this particular guide number on the scale 122, no further attention need be paid to the diaphragm setting.

In the particular settings illustrated in Fig. 1, the camera is set for taking a flash photograph at a guide number of 28, a focus distance of 5 meters, an aperture of $f:5.6$, and a shutter speed of 1/15 second.

Of course if the operator desires to use a different type of flashbulb (e.g., a larger and more powerful bulb) for a particular picture, this causes a change in the guide number, and so the camera is reset for the different guide number, by pushing the finger piece 64 forwardly to cause a temporary disconnection or uncoupling of the dog 54, then turning either the ring 48 or the ring 16 until the index mark 120 is opposite the new proper guide number on the scale 122.

When taking ordinary photographs (e.g., photographs by natural light) instead of flashlight photographs, the finger piece 64 is operated to shift the slide 66 to the opposite end of its motion, bringing the finger piece 76 near the natural light symbol 152 rather than the flashlight symbol 150. This, through the action of the cam slot 88, uncouples the dog 54 from the follower ring 94 whose position is dependent upon the focusing of the camera, and couples it to the flange 44 of the shutter speed setting control member. Thus a coupled relationship between the shutter speed and the diaphragm aperture is attained, and this is adjusted as necesasry, dependent upon the light conditions, the film employed, the filter factor if any, etc. The parts can be set to any desired relationship of shutter speed and diaphragm aperture, by moving the finger piece 64 rearwardly against the force of the spring 82, temporarily uncoupling the ring 48 from the ring 44, and then turning one or both of these rings in order to set the index mark 146 opposite the appropriate one of the integrated exposure value scale markings 144. Release of the rearward pressure on the finger piece 64 enables the spring 82 to move the dog 54 forwardly to establish the coupled relation between the parts 44 and 48. Thereafter, any turning of the shutter speed setting ring 42 to set the shutter for a different speed, causes a corresponding and complementary adjustment of the diaphragm aperture or stop, to open it to the proper extent for a shorter duration of exposure, or to close it down to the proper extent to compensate for a longer duration of exposure. The advantages of being able to couple the diaphragm adjusting member 48 alternatively either to the focusing mechanism, for use in taking flashlight photographs, or to the shutter speed adjusting mechanism, for use in taking natural light photographs, will be readily apparent to those who are acquainted with the various mental calculations required and other difficulties encountered when taking the two types of photographs by previous conventional methods.

From the foregoing description it is seen that when the knob 76 is moved to its right-hand position (viewed as in Figs. 5 and 6) the shutter speed adjusting ring 42 can be turned to adjust the shutter speed as desired, but will be coupled to the diaphragm aperture adjusting ring 48 so that the diaphragm aperture will be automatically altered to a complementary extent, when the shutter speed is changed, without changing the exposure value. This does not interfere with the rotation of the focus adjusting ring 16, which can be turned to vary the vocus as desired. When the knob 76 is moved to its left-hand position, the focus adjusting ring 16 can still be turned to adjust the focus as desired, but will be coupled to the diaphragm aperture adjusting ring 48 so that the diaphragm aperture will be automatically altered depending upon the distance for which the camera is focused, which alteration is useful in flash photography as above explained. In this left-hand position of the knob, the shutter speed adjusting ring 42 can still be turned manually to any selected shutter speed, but ordinarily will not be moved (during any given sequence of flash photographs) so long as it is set for an exposure longer than the duration of the flash.

According to a further aspect of the present invention, the construction above described may be modified to include a depth of field indicator, to show with reference to the focusing scale or distance scale 148 the maximum and minimum distances within which objects in the field of view will be in sufficiently sharp focus. In this modified construction, the parts previously described are still present in substantially the same form and so are identified by the same reference numerals previously used, without repetition of the description. In addition, certain other parts are also employed, for indicating the depth of field.

Figure 8:
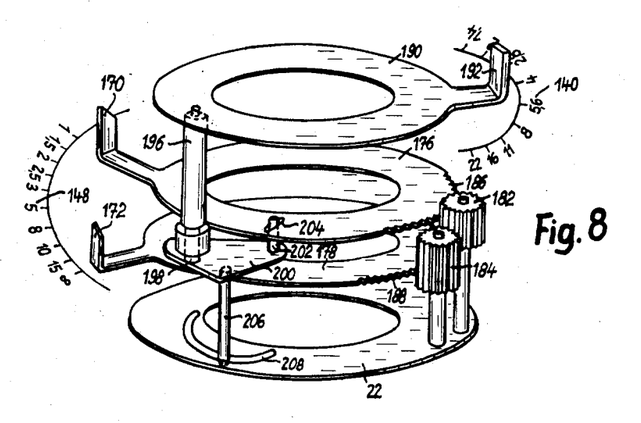
Fig. 8 is a diagrammatic perspective view of the depth of field indicating mechanism which may also be incorporated in the shutter unit, according to a second embodiment of the invention.
Figure 9:
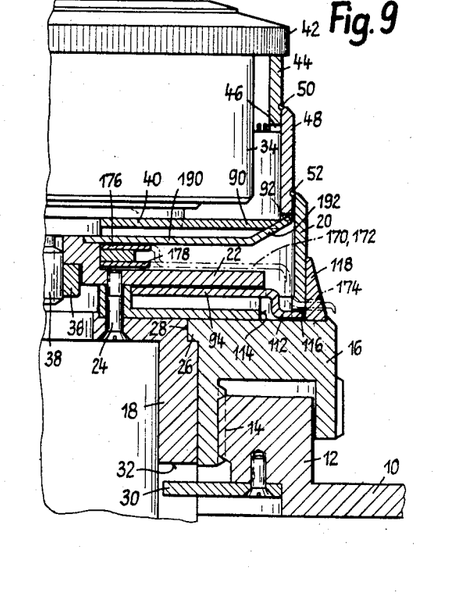
Fig. 9 is a fragmentary section on an axial radial plane, illustrating certain features of the modified construction which includes the depth of field indicator.
Figure 10:
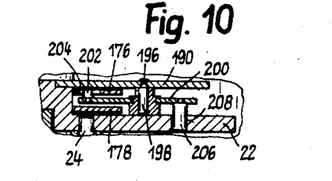
Fig. 10 is an axial radial section through a fragment of the same on a different plane, illustrating additional details.
Figure 11:
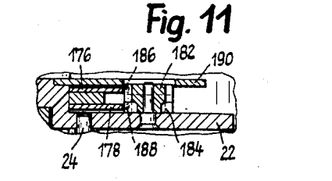
Fig. 11 is a view similar to Fig. 10 on still another plane, illustrating other details.
Figure 12:
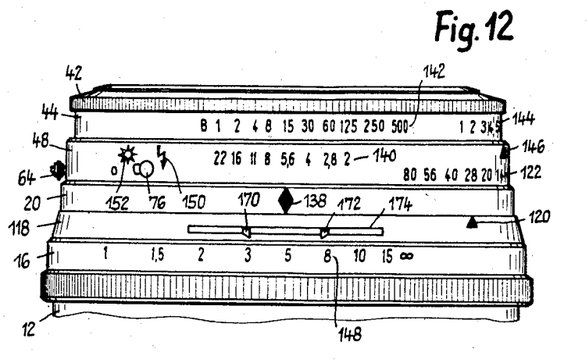
Fig. 12 is a fragmentary top plan view of a shutter unit in accordance with the second form of the invention.

This is indicated by two pointers 170 and 172 (Figs. 9 and 12) which extend radially outwardly through a circumferential slot 174 in the members 20 and 118, and which are formed as arms on a pair of rings 176 and 178 rotatable on the stationary member 22 a little distance in front of the follower ring 94, these rings 176 and 178 being separated from each other a slight distance axially by means of an interposed spacer washer or sleeve. These two rings 176 and 178 which carry the pointer arms 170 and 172 may be referred to as pointer rings, to distinguish them from the various other rings employed in this construction. The pointer rings are coupled to each other to move through equal amounts in opposite directions, the coupling preferably being accomplished by means of the gearing shown in Fig. 8. The radial plate portion of the member 22, here widened somewhat as compared with its width in the first embodiment of the invention, carries two shafts arranged parallel to the optical axis, on which pinions 182 and 184 rotate, in engagement with each other so as to turn equally in opposite directions. The pinion 182 meshes also with gear teeth 186 on part of the periphery of the pointer ring 176, while the pinion 184 meshes with gear teeth 188 on part of the periphery of the second pointer ring 178. Thus when either pointer ring is turned in one direction, the other pointer ring will be driven through an equal amount in the opposite direction.

Another ring 190, also rotatable on the stationary member 22 and located in front of the pointer ring 176, has a radial arm with a forwardly bent portion 192 which engages in the same notch 92 of the coupling ring 48 in which the arm 90 of the diaphragm adjusting ring 40 is engaged. Thus the ring 190, the diaphragm adjusting ring 40, and the coupling ring 48 all constitute, in effect, a single unit made up of parts permanently coupled together and all turning together.

Just as in the case of the non-linear transmission mechanism previously described in conjunction with Fig. 7, there is here employed a somewhat similar non-linear transmission mechanism to drive one of the pointer rings from the rotary movements of the ring 190, because the increase or decrease in depth of field has a non-linear relation to the turning of the parts 40, 48, and 190 when the diaphragm aperture is adjusted. To constitute this non-linear drive or transmission, there is a pin 196 mounted on the ring 190 and extending parallel to the optical axis, the rear portion 198 of the pin constituting a hinge point or pivot for one end of the rocking plate 200 which lies in a transverse plane between the two pointer rings 176 and 178. At the end remote from the pivot 198, the plate 200 carries a pin 202 which projects forwardly into a radial slot 204 in the pointer ring 176. At an intermediate point, the plate 200 also carries a pin 206 which extends rearwardly into a cam slot 208 in the stationary member 22. Just as was the case with the cam slot 110 in the member 20 in the previous non-linear transmission mechanism shown in Fig. 7, so also in this case the cam slot 208 serves to swing the plate 200 in one direction or the other on the pivot 198, as the plate and pivot are bodily carried around with the turning movements of the ring 190, so as to produce the required variation from a linear drive between the parts 190 and 176. When the ring 190 turns, the pointer ring 176 will turn with it to almost the same extent, but with a slight variation caused by the shape of the cam slot 208, to produce the slightly non-linear relationship between the two turning movements. The turning movement imparted to the ring 176 will be duplicated in the reverse direction by the ring 178, due to the gearing 182, 184.

In this way, when the parts 40, 48, and 190 are turned in a direction to decrease the diaphragm aperture (that is, to set the diaphragm for a larger *f* number) this will turn the pointer rings 176 and 178 in a direction to separate the pointers 170 and 172 farther from each other, thereby to indicate on the distance scale 148 the increased depth of field which is achieved. When the ring 40 and other parts are turned to increase the size of the diaphragm aperture (to a smaller *f* number) the pointers 170 and 172 will be swung closer to each other, thereby indicating on the distance scale 148 the decreased depth of field.

This depth of field indicator operates both when taking flashlight photographs and when taking photographs by natural light, so may be used by the photographer in either case, to guide him in obtaining a correctly exposed picture. When taking flashlight pictures, it is seen that the depth of field pointers 170 and 172 are effectively coupled to the focusing ring 16, because the latter is coupled to the diaphragm adjusting ring 40, the position of which in turn controls the position of the depth of field pointers. Hence the focusing of the camera for different distances (when the parts are set for flashlight pictures) will cause movement of the depth of field pointers and will enable the photographer to ascertain, without any special calculations, the maximum and minimum distance of objects which will appear in sharp focus, for any particular focus distance. If it is found, for example, that at a particular focus distance, the depth of field will not be sufficiently great to include all the objects which the photographer wishes to show sharply and clearly in the photograph, the photographer will know that either he must move closer to the subject to be photographed in order to obtain a greater depth of field, or he must choose a different and more powerful type of flashbulb, which will require a different setting of the flash guide number scale 122 to a higher number on the scale, and this in turn will close down the diaphragm aperture to a smaller size (for any given focus distance) and thereby increase the depth of field, which will be shown by movement of the pointers 170 and 172 farther apart from each other.

It will thus be observed that all of these factors of focus distance, flashlight guide number, depth of field, and diaphragm aperture are truly dependent upon each other and interact with each other in a manner which is extremely confusing to many persons when mental calculations must be made, but which is easily understood and easily acted upon when the various adjusting parts are mechanically coupled to interact with each other and to be read in conjunction with the various scales provided in accordance with the present invention.

It is also apparent that when the depth of field indicators 170 and 172 are employed, all of the information which the photographer could derive from the use of the diaphragm aperture scale 140 will be given to him in even better and more usable form by the depth of field indicators (assuming also that the integrated exposure value scale 144 is present, of course) and so this diaphragm aperture scale 140 may be entirely omitted from the device, with no loss of any useful function, whenever the device includes both the exposure value scale 144 and the depth of field indicators 170 and 172.

In referring to the members 18, 20, and 22 as stationary members, at various places in the foregoing description, it is meant that they are stationary in a rotational sense. Of course these parts move axially forwardly or backwardly relative to the camera body parts 10 and 12, whenever ring 16 is turned to change the focus distance.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera construction including a focus adjusting member, a diaphragm aperture adjusting member, a shutter speed adjusting member, and a coupling member shiftable to couple said aperture adjusting member selectively either to said focus adjusting member or to said speed adjusting member, to move therewith.

2. A photographic camera construction including a focus adjusting member, a diaphragm aperture adjusting member, a shutter speed adjusting member, and an adjustable coupling member shiftable to couple said aperture adjusting member selectively to said focus adjusting member in any one of a series of selectable positions relative thereto, or to said speed adjusting member in any one of a series of selectable positions relative thereto.

3. A construction as defined in claim 2, further including a photoflash guide number scale for indicating the relative positions of said focus adjusting member and said aperture adjusting member with respect to each other.

4. A photographic camera construction including a focus adjusting member, a diaphragm aperture adjusting member, a shutter speed adjusting member, a coupling member shiftable between a first position coupling said aperture adjusting member to said focus adjusting member and a second position coupling said aperture adjusting member to said speed adjusting member, a control member shiftable between two positions, and a spring operatively connecting said control member to said coupling member to tend to move said coupling member to its first position when said control member is moved to a first position and to tend to move said coupling member to its second position when said control member is moved to a second position, said spring being capable of flexing to provide for limited movement of said coupling member independently of the position of said control member.

5. A construction as defined in claim 4, further including cooperating means on said coupling member and said control member for limiting movement of said coupling member to one range of movement when said control member is in one position and to a different range of movement when said control member is in a different position.

6. A construction as defined in claim 1, further including non-linear transmission means operatively interposed between said focus adjusting member and said aperture adjusting member when they are coupled to each other.

7. A construction as defined in claim 2, further including an exposure value scale for indicating the relative positions of said aperture adjusting member and said speed adjusting member with respect to each other.

8. A photographic camera construction including a diaphragm aperture adjusting member, a focus adjusting member, a distance scale for indicating the focus distance for which said focus adjusting member is set, a depth of field indicator operatively connected to said aperture adjusting member and movable relative to said distance scale for indicating with reference to said distance scale the depth of field of the camera at any given setting of said aperture adjusting member and focus adjusting member, and means for coupling said depth of field indicator to said focus adjusting member to move said depth of field indicator from movement of said focus adjusting member.

9. A construction as defined in claim 8, in which said means for coupling said depth of field indicator to said focus adjusting member includes non-linear transmission means operatively interposed between said depth of field indicator and said focus adjusting member.

10. A photographic camera construction including a diaphragm aperture adjusting member, a focus adjusting member, a distance scale for indicating the focus distance for which said focus adjusting member is set, a depth of field indicator operatively connected to said aperture adjusting member and movable relative to said distance scale for indicating with reference to said distance scale the depth of field of the camera, a shutter speed adjusting member, and an adjustable coupling member shiftable to couple said aperture adjusting member selectively to said speed adjusting member in any one of a series of selectable positions relative thereto, whereupon movement of said speed adjusting member will move both said aperture adjusting member and said depth of field indicator, said coupling member also being shiftable to couple said aperture adjusting member selectively to said focus adjusting member in any one of a series of selectable positions relative thereto, whereupon movement of said focus adjusting member will move both said aperture adjusting member and said depth of field indicator.

11. A construction as defined in claim 10, further including graduated scale members for indicating the relative position of said aperture adjusting member with relation to said focus adjusting member.

12. A construction as defined in claim 11, in which one of said graduated scale members is graduated in terms of photoflash guide members.

13. A construction as defined in claim 11, further including non-linear transmission means operatively interposed between one of said scale members and said focus adjusting member, to move said one of said scale members from but in non-linear relation to movements of said focus adjusting member.

14. A photographic camera construction including a diaphragm aperture adjusting member, a focus adjusting ring, and a follower ring all rotatable concentrically about a common axis, a transmission lever pivotally mounted on one of said rings to move bodily therewith and having a pin and slot connection with the other of said rings to turn one ring from turning movement of the other ring, cam means for turning said transmission lever on its mounting pivot as it moves bodily with rotation of the ring on which it is mounted, to vary the angular extent to which one ring is driven by a given angular movement of the other ring, and means for coupling said follower ring to said diaphragm aperture adjusting member, so that when said focus adjusting ring is turned to alter the focus, said aperture adjusting member will be simultaneously turned but to a different angular extent.

15. A photographic camera construction including a diaphragm aperture adjusting member, a focus adjusting ring, and a follower ring all rotatable concentrically about a common axis, a transmission lever pivotally mounted on one of said rings to move bodily therewith and having a pin and slot connection with the other of said rings to turn one ring from turning movement of the other ring, cam means for turning said transmission lever on its mounting pivot as it moves bodily with rotation of the ring on which it is mounted, to vary the angular extent to which one ring is driven by a given angular movement of the other ring, and a manually shiftable clutch member movable between a coupling position effective to couple said follower ring to said aperture adjusting member so that said aperture adjusting member will be turned by but to a different angular extent than turning movement of said focus adjusting ring, and an uncoupling position in which said focus adjusting ring and said aperture adjusting member may each be turned independently of the other.

16. A photographic camera construction including a diaphragm aperture adjusting member, a focus adjusting ring, and a follower ring all rotatable concentrically about a common axis, a transmission lever pivotally mounted on one of said rings to move bodily therewith and having a pin and slot connection with the other of said rings to turn one ring from turning movement of the other ring, cam means for turning said transmission lever on its mounting pivot as it moves bodily with rotation of the ring on which it is mounted, to vary the angular extent to which one ring is driven by a given angular movement of the other ring, means for coupling said follower ring in driving relation to said diaphragm aperture adjusting member in any one of a series of positions of relative orientation, and scale means arranged concentric with said axis and graduated in terms of photoflash guide numbers for indicating the position of relative orientation of said follower ring with respect to said diaphragm aperture adjusting member.

17. A photographic camera construction including lens and shutter housing means of generally cylindrical angular form having an optical axis extending therethrough, a lens focus adjusting ring rotatable about said axis as a center and having a portion externally accessible for manual grasping and turning, a diaphragm aperture adjusting member also rotatable about said axis as a center, an intermediate ring enclosed within said housing means and also rotatable about said axis as a center, non-linear transmission means enclosed within said housing means for connecting said focus adjusting ring and said intermediate ring to each other to turn one ring in non-linear relation to turning movements of the other ring, and means including a manually shiftable part for selectively coupling said intermediate ring to and uncoupling it from said diaphragm aperture adjusting member so that when coupled thereto, turning movements of said focus adjusting ring will cause turning movements of said aperture adjusting member in non-linear relation to those of said focus adjusting ring.

18. A photographic camera construction including lens and shutter housing means of generally cylindrical annular form having an optical axis extending therethrough, a lens focus adjusting ring rotatable about said axis as a center and having a portion externally accessible for manual grasping and turning, a diaphragm aperture adjusting member also rotatable about said axis as a center, an intermediate ring enclosed within said housing means and also rotatable about said axis as a center, non-linear transmission means enclosed within said housing means for connecting said focus adjusting ring and said intermediate ring to each other to turn one ring in non-linear relation to turning movements of the other ring, means including a manually shiftable part externally accessible on said housing means for selectively coupling said intermediate ring to said diaphragm aperture adjusting member in rotary driving relation to each other in any selected one of a series of positions of relative orientation, and scale means graduated in terms of photoflash guide numbers and extending circumferentially of said housing means for indicating the position of relative orientation of said intermediate ring with respect to said diaphragm aperture adjusting member.

19. A photographic camera construction including lens and shutter housing means of generally cylindrical annular form having an optical axis extending therethrough, a lens focus adjusting ring rotatable about said axis as a center and having a portion externally accessible for manual grasping and turning, a diaphragm aperture adjusting member also rotatable about said axis as a center, an intermediate ring enclosed within said housing means and also rotatable about said axis as a center, non-linear transmission means enclosed within said housing means for connecting said focus adjusting ring and said intermediate ring to each other to turn one ring in non-linear relation to turning movements of the other ring, a shutter speed adjusting member also rotatable about said axis as a center, means including a manually shiftable part externally accessible on said housing means for selectively coupling said diaphragm aperture adjusting member in rotary driving relation either to said speed adjusting member in any one of a series of positions of orientation relative thereto or to said intermediate ring in any one of a series of positions of orientation relative thereto, exposure value scale means extending circumferentially of said housing means for indicating the position of orientation of said aperture adjusting member with respect to said speed adjusting member, and photoflash guide number scale means also extending circumferentially of said housing means for indicating the position of orientation of said aperture adjusting member with respect to said intermediate ring.

20. A construction as defined in claim 17, in which said non-linear transmission means includes a lever pivotally connected to one of said rings to move bodily therewith and having a pin and slot connection with the other of said rings, a cam mounted within said housing means in non-rotary relation thereto, and a pin on said lever engaging said cam to swing the lever on its pivot as the lever moves bodily with the ring on which it is mounted during turning movements of such ring.

References Cited in the file of this patent
UNITED STATES PATENTS

| | | |
|---|---|---|
| 1,627,722 | Balston | May 10, 1927 |
| 2,334,075 | Davenport | Nov. 9, 1943 |
| 2,351,834 | Phillips | June 20, 1944 |
| 2,550,698 | King et al. | May 1, 1951 |

FOREIGN PATENTS

| | | |
|---|---|---|
| 1,111,448 | France | Oct. 26, 1955 |